Dec. 29, 1942.  C. F. MAILEY  2,306,550
COMBINATION COVER AND DISPENSING DEVICE FOR CANNED MILK
Filed Feb. 26, 1941  3 Sheets-Sheet 1

Inventor
Carl F. Mailey

By *Clarence A. O'Brien*

Attorney

Dec. 29, 1942.  C. F. MAILEY  2,306,550
COMBINATION COVER AND DISPENSING DEVICE FOR CANNED MILK
Filed Feb. 26, 1941  3 Sheets-Sheet 2

Inventor
Carl. F. Mailey
By Clarence A. O'Brien
Attorney

Dec. 29, 1942.   C. F. MAILEY   2,306,550
COMBINATION COVER AND DISPENSING DEVICE FOR CANNED MILK
Filed Feb. 26, 1941   3 Sheets-Sheet 3

Inventor
Carl F. Mailey
By *Clarence A. O'Brien*
Attorney

Patented Dec. 29, 1942

2,306,550

UNITED STATES PATENT OFFICE 2,306,550

COMBINATION COVER AND DISPENSING DEVICE FOR CANNED MILK

Carl F. Mailey, Latrobe, Pa.

Application February 26, 1941, Serial No. 380,722

5 Claims. (Cl. 65—61)

My invention relates to improvements in combined covers and dispensing devices for canned milk or other canned liquid.

The principal object in view is to provide a device of the character indicated which is adapted for quick and easy attachment to, or detachment from, the usual can, or tin, containing milk, or the like, for table use, to completely cover the unsightly can, puncture the same for pouring therefrom and also for venting air to facilitate pouring, and to equip the can with a pouring spout and handle whereby the contents may be dispensed conveniently at will.

Other objects are to provide a device of this character and for the purpose above set forth which is simple in construction, sanitary, durable, inexpensive to manufacture, and which is equipped for completely sealing the can at will when desired.

To the accomplishment of the above, and subordinate objects presently appearing, a preferred embodiment of my invention has been illustrated in the accompanying drawings, set forth in detail in the succeeding description and defined in the claims appended hereto.

Figure 1:
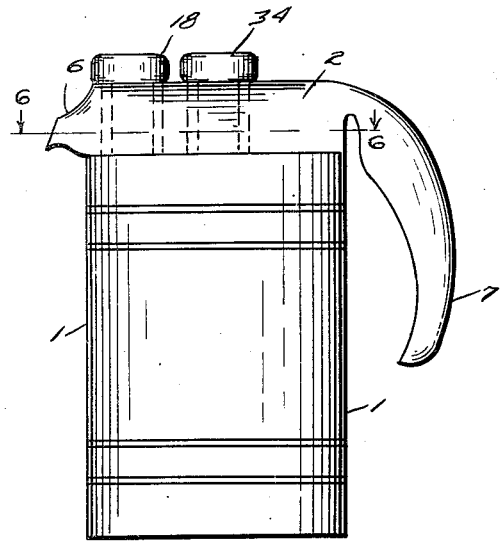
Figure 2:
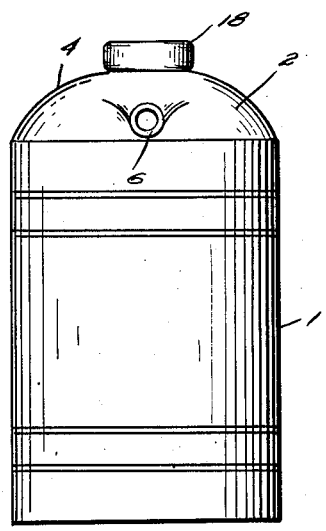
Figure 3:
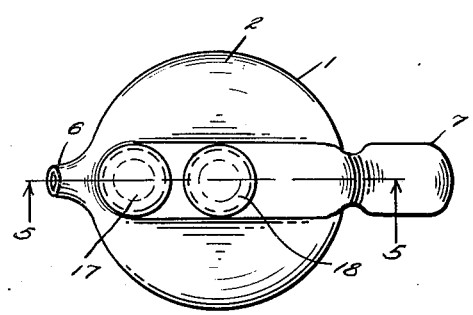
Figure 4:
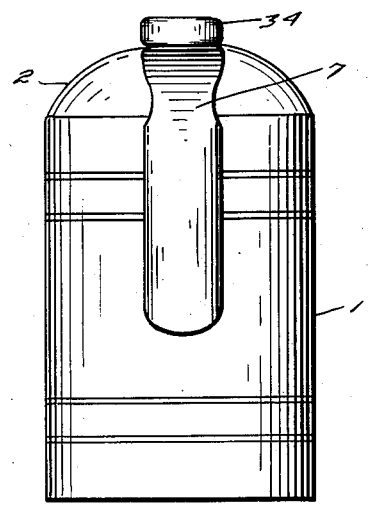
Figure 5:
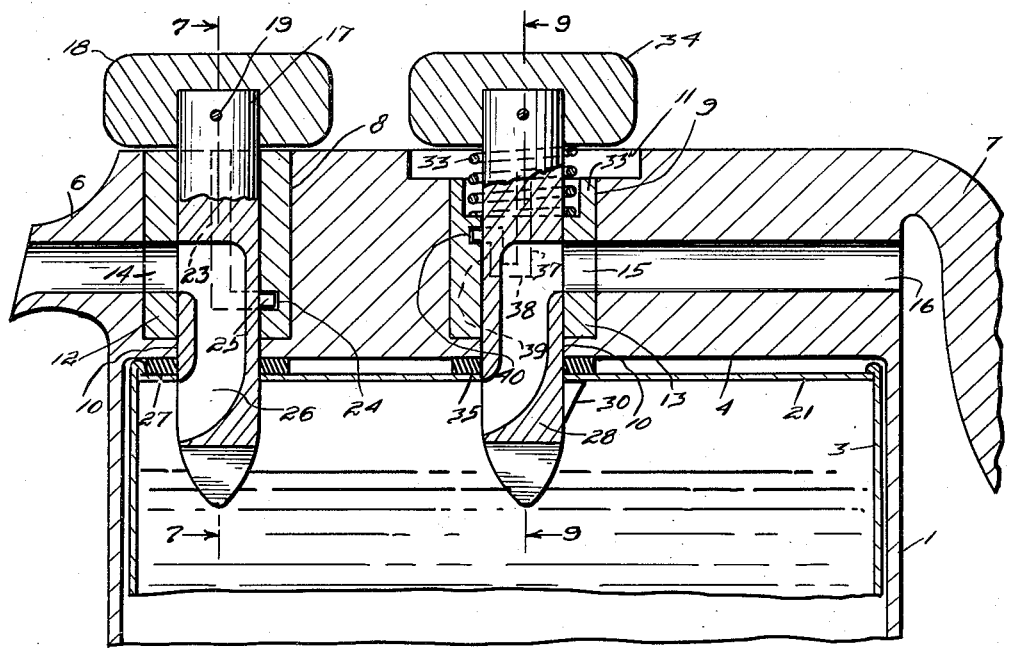
Figure 6:
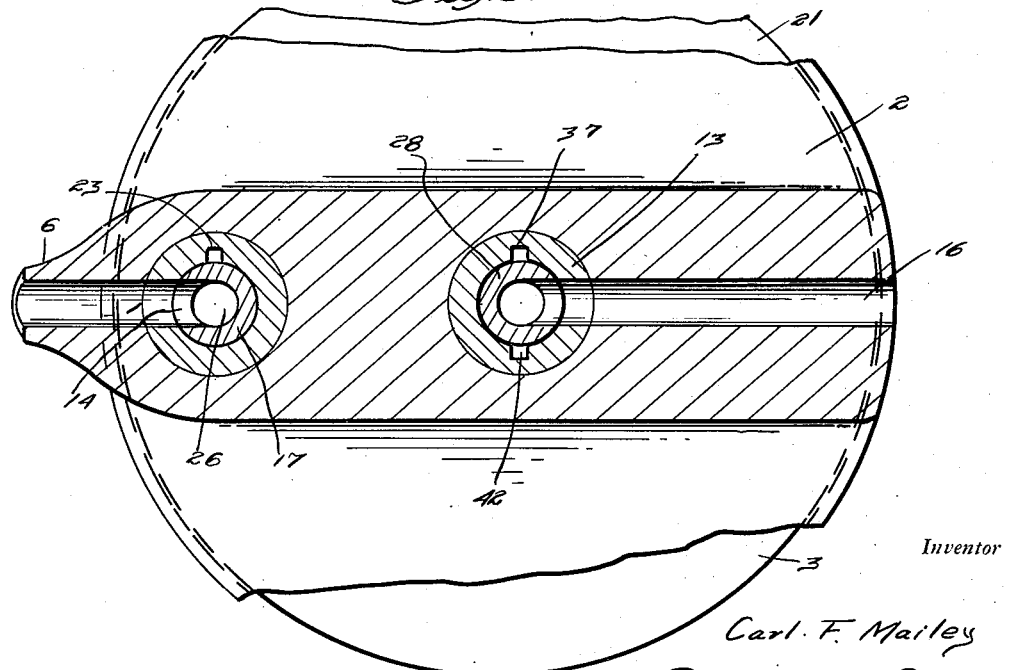
Figure 7:
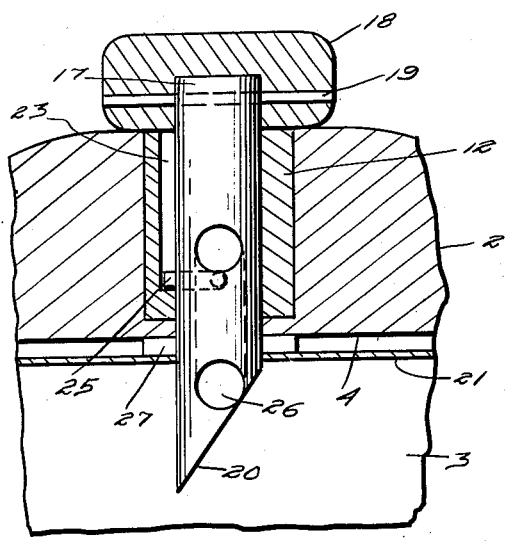
Figure 8:
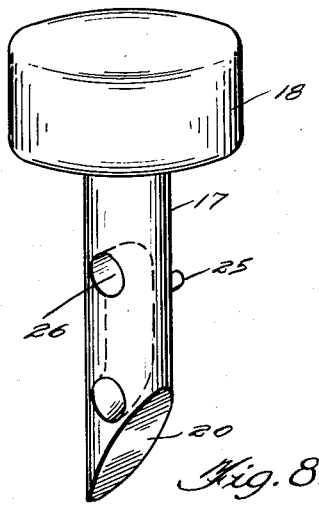
Figure 9:
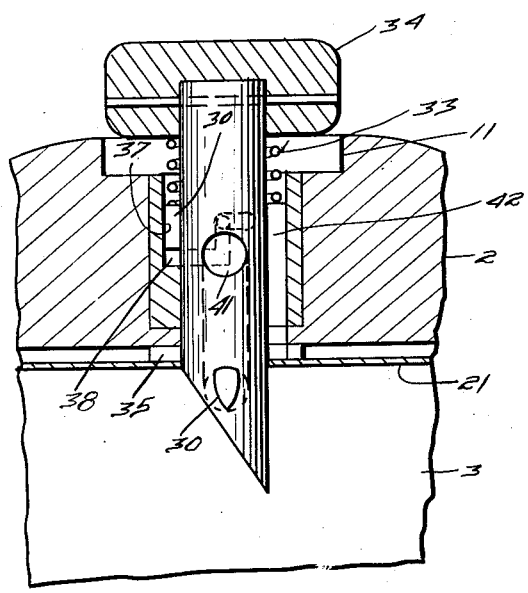
Figure 10:
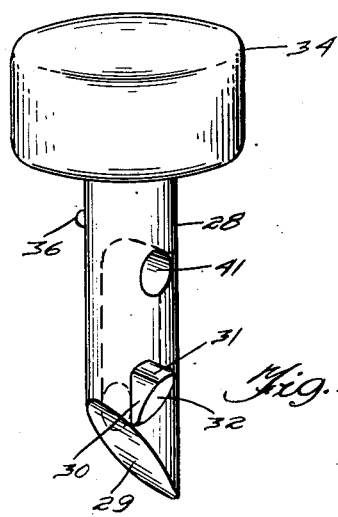

In said drawings:

Figure 1 is a view in side elevation of the preferred embodiment of my invention, Figure 2 is a view in front elevation, Figure 3 is a view in top plan, Figure 4 is a view in rear elevation, Figure 5 is a fragmentary view in transverse section taken on the line 5—5 of Figure 3 and drawn to an enlarged scale, Figure 6 is a fragmentary view in horizontal section taken on the line 6—6 of Figure 5 and drawn to an enlarged scale, Figure 7 is a fragmentary view in vertical section taken on the line 7—7 of Figure 5, Figure 8 is a view in perspective of the pouring core, Figure 9 is a fragmentary view in vertical section taken on the line 9—9 of Figure 5, and Figure 10 is a view in perspective of the air vent core.

Describing my invention in detail, with reference to the drawings by numerals, the basic element of the combined cover and dispensing device is a cylindrical shell 1 having a closed top 2 and which is open at its bottom and of the requisite size to fit, with a slight clearance, over a milk can, or tin, 3 such as is provided by the trade for evaporated or condensed table milk, so that said shell forms a cover for the can. The top 2 is preferably of substantially greater thickness than the remainder of the shell and has a flat bottom face 4 and a crowned top face 5. At diametrically opposite sides thereof, the top 2 is provided with a short pouring spout 6 and a depending handle 7 which may be of any suitable form. The shell 1 is preferably formed of any light, strong metal, such as aluminum.

The top 2 of the shell 1 is bored to provide a pair of cylindrical sockets 8, 9, extending downwardly thereinto close to the bottom face 4, one at the same side of the top 2 as the spout 6 and opposite the same, and the other in the axis of the top 2, or shell 1, said top 2 being counterbored to provide a circular, axial, through aperture 10 in the bottom of each socket 8, 9. A countersink 11 is provided in the top 2 around the upper end of the socket 9 for a purpose presently seen.

A pair of cylindrical bearing sleeves 12, 13, are fitted in the sockets 8, 9, respectively, with a press fit, and which are of any suitable metal harder than that of said top 2. The sleeve 12 is provided with a radial discharge port 14 adapted to face the pouring spout 6 and to open thereinto. The sleeve 13 is provided with a similar air vent port 15 facing the handle 7 and opening into a radial air vent duct 16 provided in the top 2 and opening opposite the handle 7 so that its outer end is hidden from view by said handle.

Fitted into the bearing sleeve 12 for rotation and endwise movement vertically inwardly and outwardly of the shell 1 is a can puncturing and pouring core 17 provided on its upper end with a flat knob 18 forming a hand grip for manipulating said core and secured to the core by a pin, as at 19. The lower end of the core 17 is beveled to a cutting edge, as shown at 20, for perforating the top 21 of the can 3, and said core is of the proper length to permit the beveled end 20 to be forced downwardly past the perforation or puncture made thereby in said can top 21, so that an intermediate part of said core seals said perforation or puncture.

Means are provided in the sleeve 12, and on the core 17, for establishing a downward limit of movement of said core and permitting a quarter turn of said core in said limit, in opposite directions, and for a purpose presently seen, said means comprising an internal longitudinal groove 23 in the sleeve 12 extending downwardly therein and terminating at its bottom in a circumferential extension 24, and a radial pin 25 on the core 17 extending into said groove, the arrangement being such that the bottom of the groove is engaged by said pin to limit downward movement of the core and the latter is limited to a quarter turn by play of the pin in the extension 24. The core 17 is provided with a longitudinally and laterally extending pouring duct 26 therein opening laterally at its upper and lower ends onto the side of the core diametrically opposite the pin 25, the lower end of the duct opening in the downward limit of movement of the core 12 into the can 3 and the upper end of said duct opening in said limit of movement into the pouring spout 6 when said core is given a quarter turn in one direction. As best shown in Figure 5, when the core 17 is turned so that the upper end of the pouring duct 26 registers with the pouring spout 6, the lower end of said duct opens toward the near side of the can 3 so that all the contents of the can may be poured out of the same. By turning the core 17 a quarter turn in the opposite direction, the pouring duct 26 is moved out of registration relative to the pouring spout 6 and said spout thus closed off from the can so that pouring is blocked. In this position of the core 17, it may be pulled upwardly to withdraw it from an empty can 3 preparatory to perforating a new can over which the shell has been placed. A resilient gasket 27 is interposed between the can top 21 and the shell top 2 to surround the core 17 and facilitate sealing the top around the puncture, or aperture, formed by said core.

A second can puncturing and venting core 28, similar, with the exceptions presently noted, to core 17 is fitted in the sleeve 13 for operation in the same manner as core 17. The core 28 differs from the core 17 in the following respects. On one side thereof, adjacent the lower beveled end 29 of the core 28 is a lateral lug 30 having a radial top edge 31 and a downwardly and inwardly inclined outer face 32 and which is designed to be forced through the can top 21, under downward movement of the core 28, coincidentally with final puncturing of the can top 21 by the beveled end 29, and to then be rotated under said can top 21 under a slight turn of the core 28 in one direction. A coil spring 33 is sleeved onto the core 28, between the knob 34 of said core and the bottom of a countersink 33' provided in the upper end of the sleeve 13, said spring urging the core 28 upwardly so that when said lug 30 is rotated under the can top 21 and said core, or the knob 34, released, the core is urged upwardly to clamp the top edge 31 of the lug 30 against the top 21 whereby said lug suspends and locks the can 3 in the top 2 of shell 1, as will be clear. A gasket 35 similar to gasket 27, surrounds the core 28 between the shell top 2 and the can top 21 and for the same purpose as gasket 27. Both gaskets 27, 35 are suitably fixed to the bottom face 4 before the shell 1 is positioned over said can. The before-mentioned countersink 11 accommodates the knob 34 in the downward limit of movement of the core 28. A radial pin 36 on the core 28 and a longitudinal internal groove 37 in the sleeve 13 establishes the downward limit of movement of the core 28. The groove 37 has a circumferential lower end extension 38 permitting the beforementioned slight turn of said core, and which terminates in an upturned branch groove 39 permitting upward, or locking movement, of the core 28 under the urge of the spring 33, said branch opening into a circumferential groove 40 for permitting a quarter turn of the core 28 in the locking position thereof. A longitudinally and laterally extending vent duct 41 is provided in the core 28 opening at its upper and lower ends into the duct 16 and into the can 3, respectively, the upper end thereof being arranged to register with said duct 16 when the core 28 is given a quarter turn in one direction to vent air from the can 3 for a purpose which will be clear. Obviously, a quarter turn of said core 28 in the opposite direction, in the locking position of the core, will move said duct 41 out of registration with the vent 16 and prevent air from leaving or entering the can 3 so that the contents of the can may be kept air tight when required, the core 17 having been rotated to cut off the duct 26 from the spout 6. By turning the core in the proper direction to move the pin 36 into the branch 39 of the extension 38 of slot 37, the core 28 may be forced downwardly into its limit of movement in that direction into unlocking position to disengage the lug 30 from the can top 21 and then by turning said core 28 slightly with the pin 36 operating in the extension 38 of slot 37, said lug 30 may be registered with the opening made thereby in the can top 21 so that said core 28 may be lifted out of the can top 21 clear of the same. A longitudinal internal, through groove 42 is provided in the sleeve 13 diametrically opposite groove 37 for the passage of the lug 30 through said sleeve under insertion of the core 28 into the sleeve.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is:

1. A top structure for a can covering shell including a flat bottom face and a crowned top face, a pair of bearing sleeves in said top vertically disposed one in the center and the other adjacent one side of the top and each provided with a radial outlet aperture therein, said top embodying a pouring spout and an air vent duct leading from said outlet apertures, respectively, a pair of can perforating cores fitted in said sleeves, respectively, for endwise movement vertically and having lower cutting ends adapted for perforating the top of the can under downward movement thereof, said cores having ports therein adapted to establish communication between the interior of the can and said apertures and being rotatable in limited degree in opposite directions to establish and interrupt such communication at will, and coacting slot and pin devices on said sleeves and cores for limiting downward and rotary movement of said cores.

2. A top structure for a can covering shell including a flat bottom face and a crowned top face, said top having a pair of diametrically opposite radial pouring and air vent ducts therein, respectively, means adapted to establish communication between the interior of the can and the pouring duct comprising a ported can puncturing core mounted in said top and adapted for endwise movement downwardly through the upper end of the can, and means adapted to establish communication between the interior of the can and said air vent duct comprising a second ported can puncturing core mounted in said top for endwise puncturing movement downwardly through said end of the can, the second mentioned core having a radial lug adapted to be thrust through said end of the can under puncturing movement of said second core, said second core being rotatable to swing the lug under the bottom face of said end of the can into interlocking engagement with said end whereby the core is locked to the top of the shell.

3. A top structure for a can covering shell including a flat bottom face and a crowned top face, said top having a pair of diametrically opposite radial pouring and air vent ducts therein, respectively, means adapted to establish communication between the interior of the can and the pouring duct comprising a ported can puncturing core mounted in said top and adapted for endwise movement downwardly through the upper end of the can, and means adapted to establish communication between the interior of the can and said air vent duct comprising a second ported can puncturing core mounted in said top for endwise puncturing movement downwardly through said end of the can, the second mentioned core having a radial lug adapted to be thrust through said end of the can under puncturing movement of said second core, said second core being rotatable to swing the lug under the bottom face of said end of the can into interlocking engagement with said end whereby the core is locked to the top of the shell, and means to limit downward movement of said second core and rotation thereof.

4. A top structure for a can covering shell including a flat bottom face and a crowned top face, said top having a pair of diametrically opposite radial pouring and air vent ducts therein, respectively, means adapted to establish communication between the interior of the can and the pouring duct comprising a ported can puncturing core mounted in said top and adapted for endwise movement downwardly through the upper end of the can, and means adapted to establish communication between the interior of the can and said air vent duct comprising a second ported can puncturing core mounted in said top for endwise puncturing movement downwardly through said end of the can, the second mentioned core having a radial lug adapted to be thrust through said end of the can under puncturing movement of said second core, said second core being rotatable to swing the lug under the bottom face of said end of the can into interlocking engagement with said end whereby the core is locked to the top of the shell, and spring means urging the second mentioned core upwardly and said lug against said bottom face.

5. A top structure for a can covering shell including a flat bottom face and a crowned top face, said top having a pair of diametrically opposite radial pouring and air vent ducts therein, respectively, means adapted to establish communication between the interior of the can and the pouring duct comprising a ported can puncturing core mounted in said top for endwise movement downwardly through the upper end of the can, and means adapted to establish communication between the interior of the can and said air vent duct comprising a second ported can puncturing core mounted in said top for endwise puncturing movement downwardly through said end of the can, the second mentioned core having a radial lug adapted to be thrust through said end of the can under puncturing movement of said second core, said second core being rotatable to swing the lug under the bottom face of said end of the can into interlocking engagement with said end whereby the core is locked to the top of the shell, and means to limit downward movement of said second core and rotation thereof, the second mentioned core being ported for registration of the port therein with said air vent duct under rotation of the core.

CARL F. MAILEY.